(12) United States Patent
Anderson et al.

(10) Patent No.: US 12,097,731 B2
(45) Date of Patent: Sep. 24, 2024

(54) AUTOMATIC WEIGHT DISTRIBUTION SYSTEM AND METHOD WITH CONTINUOUS MONITORING

(71) Applicant: Dexter Axle Company LLC, Elkhart, IN (US)

(72) Inventors: Jed K. Anderson, Lindon, UT (US); David F. Lundgreen, Spanish Fork, UT (US); Jason R. Harper, Spanish Fork, UT (US)

(73) Assignee: Dexter Axle Company LLC, Elkhart, IN (US)

( * ) Notice: Subject to any disclaimer, the term of this patent is extended or adjusted under 35 U.S.C. 154(b) by 51 days.

(21) Appl. No.: 17/829,904

(22) Filed: Jun. 1, 2022

(65) Prior Publication Data

US 2023/0077074 A1   Mar. 9, 2023

Related U.S. Application Data

(63) Continuation-in-part of application No. 17/580,537, filed on Jan. 20, 2022, now abandoned, which is a continuation of application No. 17/468,545, filed on Sep. 7, 2021, now abandoned.

(51) Int. Cl.
*B60D 1/24* (2006.01)
*B60D 1/26* (2006.01)
*B60D 1/46* (2006.01)

(52) U.S. Cl.
CPC .............. *B60D 1/247* (2013.01); *B60D 1/26* (2013.01); *B60D 1/465* (2013.01)

(58) Field of Classification Search
CPC . B60D 1/26; B60D 1/62; B60D 1/247; B60D 1/248; B60D 1/345; B60D 1/465
USPC ....................................... 280/405.1
See application file for complete search history.

(56) References Cited

U.S. PATENT DOCUMENTS

| | | |
|---|---|---|
| 4,253,680 A | 3/1981 | Albright |
| 5,580,076 A | 12/1996 | DeRoule |
| 5,823,558 A | 10/1998 | Shoquist |
| 7,934,742 B2 | 5/2011 | Anderson |
| 9,522,582 B2 | 12/2016 | Cullen |
| 2008/0277903 A1* | 11/2008 | Anderson ............... B60D 1/30 280/504 |
| 2019/0232740 A1 | 8/2019 | Anderson |
| 2020/0108678 A1 | 4/2020 | Pierce |
| 2020/0317212 A1 | 10/2020 | Rogness |
| 2020/0406693 A1 | 12/2020 | Hall |

(Continued)

*Primary Examiner* — Jacob D Knutson
*Assistant Examiner* — Felicia L. Brittman
(74) *Attorney, Agent, or Firm* — McGarry Bair PC

(57) ABSTRACT

A system for automated trailer weight distribution, including: A system for automated trailer weight distribution, having a tow vehicle with a hitch mount having a spring bar. The system may also include a trailer and a spring bar mount disposed on the trailer and having an initial position relative to the trailer, where the spring bar mount is configured to receive and engage the spring bar. Furthermore, a weight distribution measurement device disposed in association with the tow vehicle and being configured and arranged to determine a weight distribution of the tow vehicle when the spring bar is engaged with the spring bar mount and a weight distribution actuator can be configured and arranged to adjust the height of the spring bar mount while engaged with the spring bar.

26 Claims, 16 Drawing Sheets

(56) References Cited

U.S. PATENT DOCUMENTS

| | | |
|---|---|---|
| 2021/0094370 A1 | 4/2021 | McAllister |
| 2021/0094371 A1* | 4/2021 | McAllister ............. B60D 1/247 |
| 2021/0170819 A1 | 6/2021 | Doman |
| 2021/0260940 A1 | 8/2021 | Hall |
| 2021/0260941 A1 | 8/2021 | Hall |

* cited by examiner

AUTOMATIC WEIGHT DISTRIBUTION SYSTEM AND METHOD WITH CONTINUOUS MONITORING

CROSS-REFERENCE TO RELATED APPLICATIONS

This application is a continuation-in-part of U.S. patent application Ser. No. 17/580,537, filed on Jan. 20, 2022, which is a continuation of U.S. patent application Ser. No. 17/468,545, filed on Sep. 7, 2021, which is hereby incorporated by reference herein in its entirety, including but not limited to those portions that specifically appear hereinafter, the incorporation by reference being made with the following exception: in the event that any portion of the above-referenced application is inconsistent with this application, this application supersedes said above-referenced application.

STATEMENT REGARDING FEDERALLY SPONSORED RESEARCH OR DEVELOPMENT

Not applicable.

BACKGROUND

1. The Field of the Present Disclosure

The present disclosure relates generally to trailer weight distribution hitch systems, and more particularly, but not necessarily entirely, to trailer hitch systems for measuring the weight and resulting forces exerted by a trailer while using a weight distribution mechanism and adjusting a weight distribution system to account for changes in vehicle weight.

2. Description of Related Art

It should be appreciated that the correct balance of a trailer load is necessary for safe towing. When towing a trailer, the tow vehicle often sags in the rear and raises in the front. The weight of the trailer on the rear of the tow vehicle can cause the rear tires and axle to carry a significant majority of the percent of the load of the trailer tongue, as known as tongue weight, and can also result in a transfer of some of the weight from the front of the tow vehicle itself, to the rear axle of the tow vehicle. This unbalanced loading can cause an unsafe driving situation.

Unbalanced loading can reduce steering and braking capabilities in the tow vehicle and in extreme situations it can cause accelerated wear to the mechanical components of the tow vehicle and trailer, and compromise the performance of the tow vehicle.

To aid in mitigating this type of unbalanced loading, people often purchase hitches that operate to transfer some of the weight from the rear axle of the tow vehicle to the front axle of the tow vehicle. This operation is referred to in the field as "weight distribution," and the phrase "weight distribution" as used herein, shall therefore refer to the operation of transferring some of the weight from the rear axle of the tow vehicle to the front axle of the tow vehicle. However, when towing a trailer it can be difficult for a user to know if they have achieved correct weight distribution. Further, as trailers are constantly being loaded differently, a previously correct weight distribution setup may not remain optimal and need to be reevaluated and adjusted accordingly.

The prior art is characterized by several disadvantages that may be addressed by the present disclosure. The present disclosure minimizes, and in some aspects eliminates, the failures of the prior art, by utilizing the system and components described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
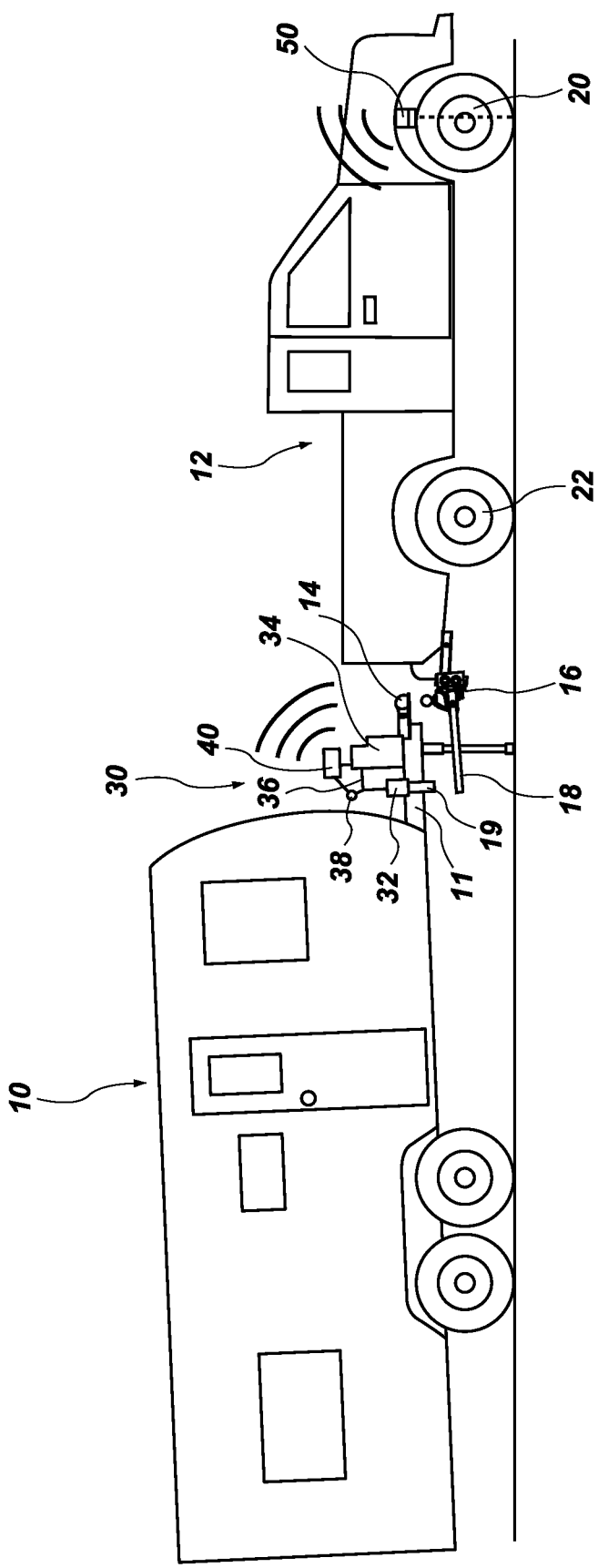
FIG. 1 is a side view of a schematic of the disclosed weight distribution system.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Applicant has discovered an improved system and method for determining weight distribution of said trailer after loaded on a tow vehicle, and after the tow vehicle and the trailer engage a weight distribution mechanism, whereby the improved system automatically adjusts the weight distribution systems to compensate for changes in loading and loading conditions. The phrase "weight distribution" as used herein, shall refer to the operation of transferring some of the tow vehicle weight from the rear axle of the tow vehicle to the front axle of the tow vehicle when towing a trailer.

The generally accepted safe and proper tongue weight is roughly 10 to 15 percent of the total loaded trailer weight. The load of a trailer should also be properly balanced to achieve a tongue weight within the safe and proper range.

Applicant has discovered a system and method configured to measure and automatically adjust the weight distribution of the trailer, which can greatly reduce unsafe towing by providing users an effective mechanism configured to measure weight distribution and properly transferring or redistributing the loads from towing a trailer across the tow vehicle and trailer axles.

FIGS. 1-6 illustrate a first disclosed embodiment of an automatic weight distribution system for facilitating a more even load on a tow vehicle. Specifically, FIG. 1 illustrates a trailer 10 and a tow vehicle 12. The trailer 10 may include a tongue 14 configured to receive a trailer hitch 16 attached to the tow vehicle 12. The trailer 10 may also include a trailer frame 11, and the tongue 14 may be attached to the trailer frame 11. The trailer hitch 16 may also include a weight distribution mechanism having a pair of spring bars 18 designed and configured to engage or bias against corresponding spring bar mounts 19 to more evenly distribute the load from the trailer 10 over the axles of the tow vehicle 12, as opposed to placing all or most of the load of the trailer's tongue weight on the rear axle of the tow vehicle 12. The spring bar mounts 19 may be attached to or otherwise disposed on or confined to movement with the trailer frame 11. It is to be understood that the concept of the spring bar mounts 19 being disposed on the trailer 10 or trailer frame 11 shall be construed such that the phrase "disposed on" covers broadly the concept of spring bar mounts 19 being either directly attached to the trailer 10 or the trailer frame 11 or otherwise not directly attached to the trailer 10 or the trailer frame 11, but confined to movement with the trailer 10 or the trailer frame 11. It is to be further understood that the trailer 10 may include the trailer frame 11, it is also to be understood that the trailer 10 and the trailer frame 11 may be separate and distinct elements. FIG. 1 illustrates the trailer 10 and tow vehicle 12 before the trailer 10 has been loaded onto the tow vehicle 12. Also shown in FIG. 1 is that the tow vehicle 12 at a base line, meaning the chassis of the vehicle is substantially balanced between the front wheels 20, or front axle, and the rear wheels 22, or rear axle.

FIG. 1 also illustrates a spring bar actuator 30 that can be connected to each of the spring bar mounts 19 and configured to actuate the spring bar mounts 19 vertically, or substantially vertically, or up and down, such that when the spring bars 18 are engaged with the corresponding spring bar mounts 19, the spring bar actuator can bias or, increase or decrease, the pressure, or torque or force or load angle, on the spring bars 18 which also changes the amount of weight being distributed from the trailer 10 to the to vehicle 12. In alternative embodiments also disclosed herein, the spring bar actuator 30 may also be configured to bias, or apply torque, to the spring bars 18 in horizontal or substantially horizontal directions, or at any other desired angle between vertical and horizontal.

Additionally, as described in further detail below, it is to be understood that the actuator 32 can apply a force in any direction that is controlled by a logic unit 40. Such an actuation may causes a repeatable, controllable change in the amount of weight distribution applied to the vehicle/trailer combinations.

As illustrated in FIGS. 1-6, the spring bar actuator 30 may include a mount actuator 32 in fluid, mechanical, pneumatic, or electrical communication with an actuator 34, such as a pressure actuator for example, that may be configured to facilitate movement of the mount actuator 32, in a vertical or substantially vertical direction, or generally up and down. The spring bar actuator 30 may be permanently or temporarily mounted to the trailer 10 and may be powered by any desired mechanism, such as a battery, fuel, or desired electrical power or other known power source.

The mount actuator 32 may be an air bag mechanism that inflates to actuate vertical movement of the spring bar mounts 19, with upward vertical movement being facilitated by increased pressure of the air bag and downward vertical movement of the spring bar mounts 19 facilitated by reduced pressure of the air bag.

The mount actuator 32 may alternatively be any desired mechanism that can provide generally upward, downward, horizontal, or angular movement of the spring bar mounts 19, such as, for example, pneumatic, hydraulic, mechanical or electric powered piston or other vertical or horizontal actuation device or mechanism. Examples of additional or alternative pressure actuators and mount actuators are provided below with respect to FIGS. 7-10.

The actuator 34 may be in fluid, mechanical or electrical communication with the mount actuator 32 via a power or pressure line 36. The line 36 may, for example, provide fluid pressure, such as air or hydraulic fluid for example, to the mount actuator 32 to facilitate the desired movement. The line 36 may include a secondary sensor 38, such as a pressure sensor for example, or any other desired measurement device. The sensor 38 may monitor air pressure, hydraulic pressure, linear displacement, or other desired attribute that may facilitate movement of the mount actuator 32.

The sensor 38 may be in communication with a logic unit 40 which may be configure to control the output of the spring bar actuator 30 and more specifically the actuator 34. The logic unit 40 may be programmed to turn on and off the actuator 34 to increase or decease the pressure or power transferred to the mount actuator 32, thereby moving the mount actuator vertically, up or down, to desired levels.

The logic unit 40 may be in communication with the secondary sensor or pressure sensor 38 which can continuously monitor and provide pressure or displacement levels of the mount actuator, which can indirectly provide a measurement of, either absolute or relative, weight distribution being provided by the spring bars 18 on the spring bar mounts 19. This communication can be hardwired, or transmitted by electrical signal such as WiFi or bluetooth, for example. The pressure information provided by the pressure sensor 38 may be used by the logic unit to determine if the pressure actuator should be activated to increase or decrease the pressure provided to the mount actuator 32 to move the mount actuator vertically up or down, to compensate for changes in trailer load, driver or user preference, road condition, or to meet a desired target weight distribution.

Figure 2:
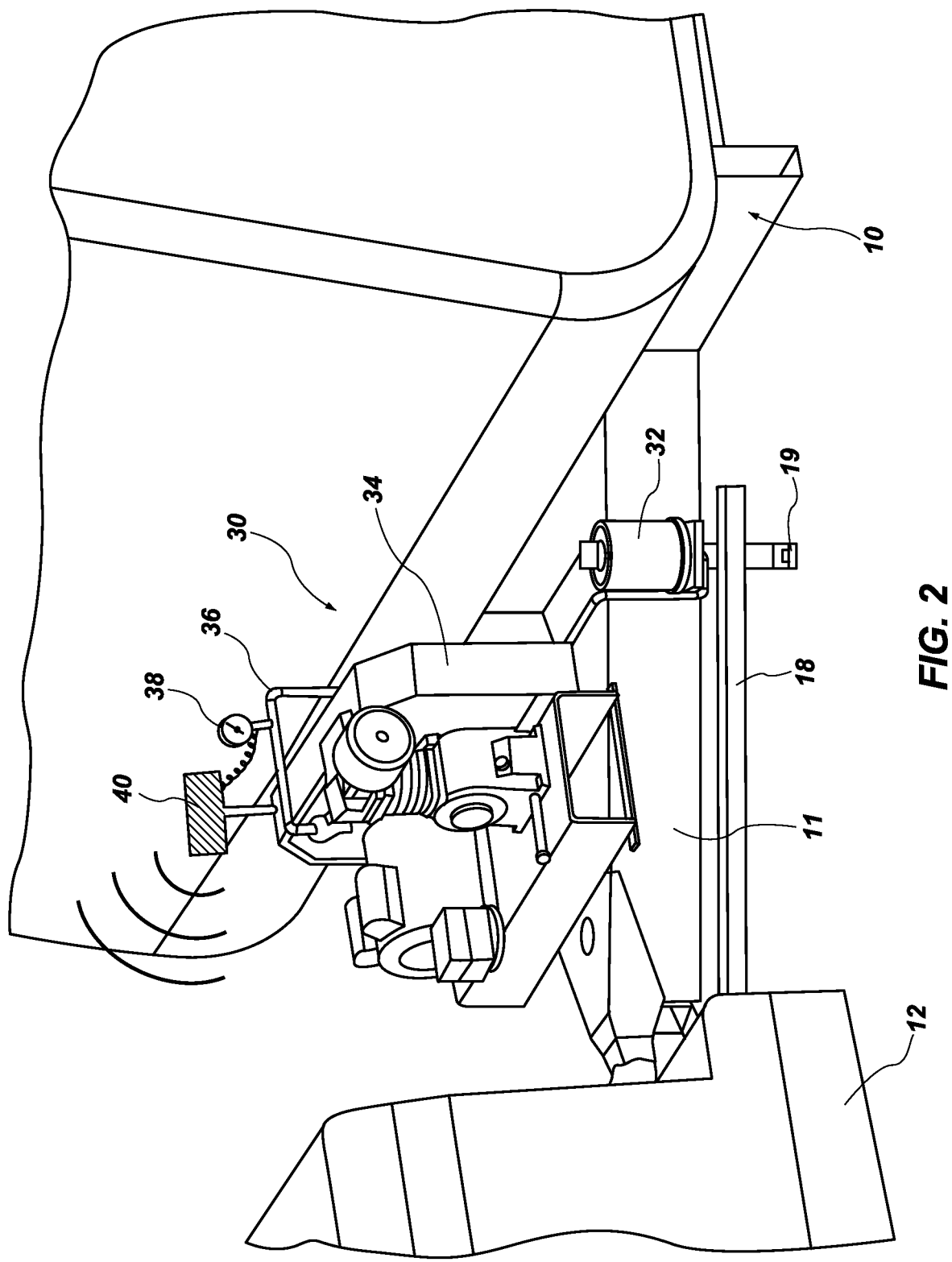
FIG. 2 is a perspective view of the disclosed weight distribution system.
Figure 3:
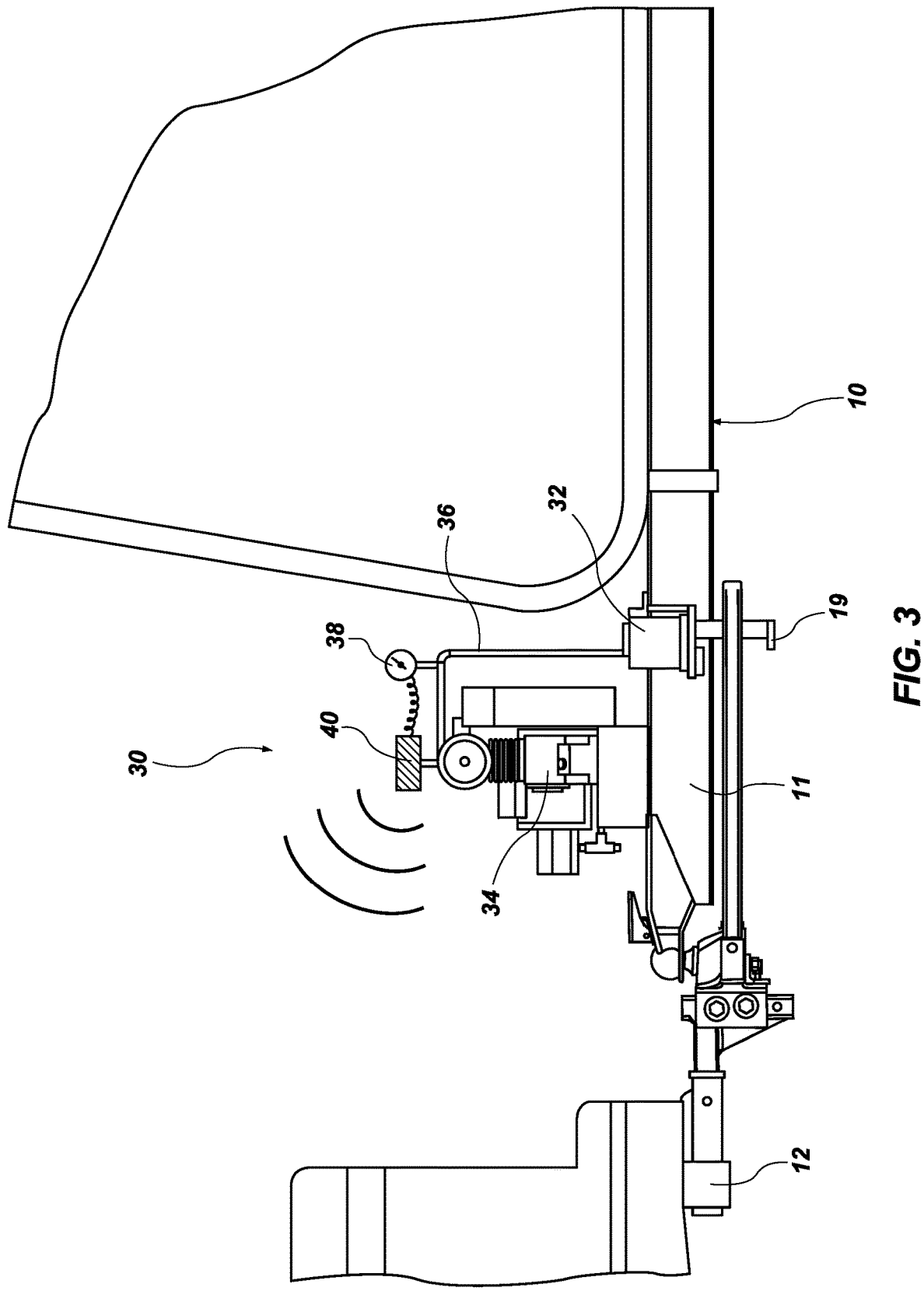
FIG. 3 is a side view of a schematic of the disclosed weight distribution system.

FIGS. 2 and 3, illustrate the trailer 10 and tow vehicle 12 after the trailer 10 is loaded onto the tow vehicle 12, but before engagement of the spring bars or weight distribution mechanism 18. Also shown in FIGS. 2 and 3 is the tow vehicle 12 in a loaded state, meaning the trailer hitch 16 and rear wheels 22 may be holding all or the substantial majority of the tongue weight of the trailer 10 and some of the load of from the front axle of the tow vehicle 12, causing the chassis of the vehicle 12 to substantially tilt toward the rear of the vehicle 12, causing the front of the vehicle 12 to raise up from the front wheels 20, or front axle.

Figure 4:
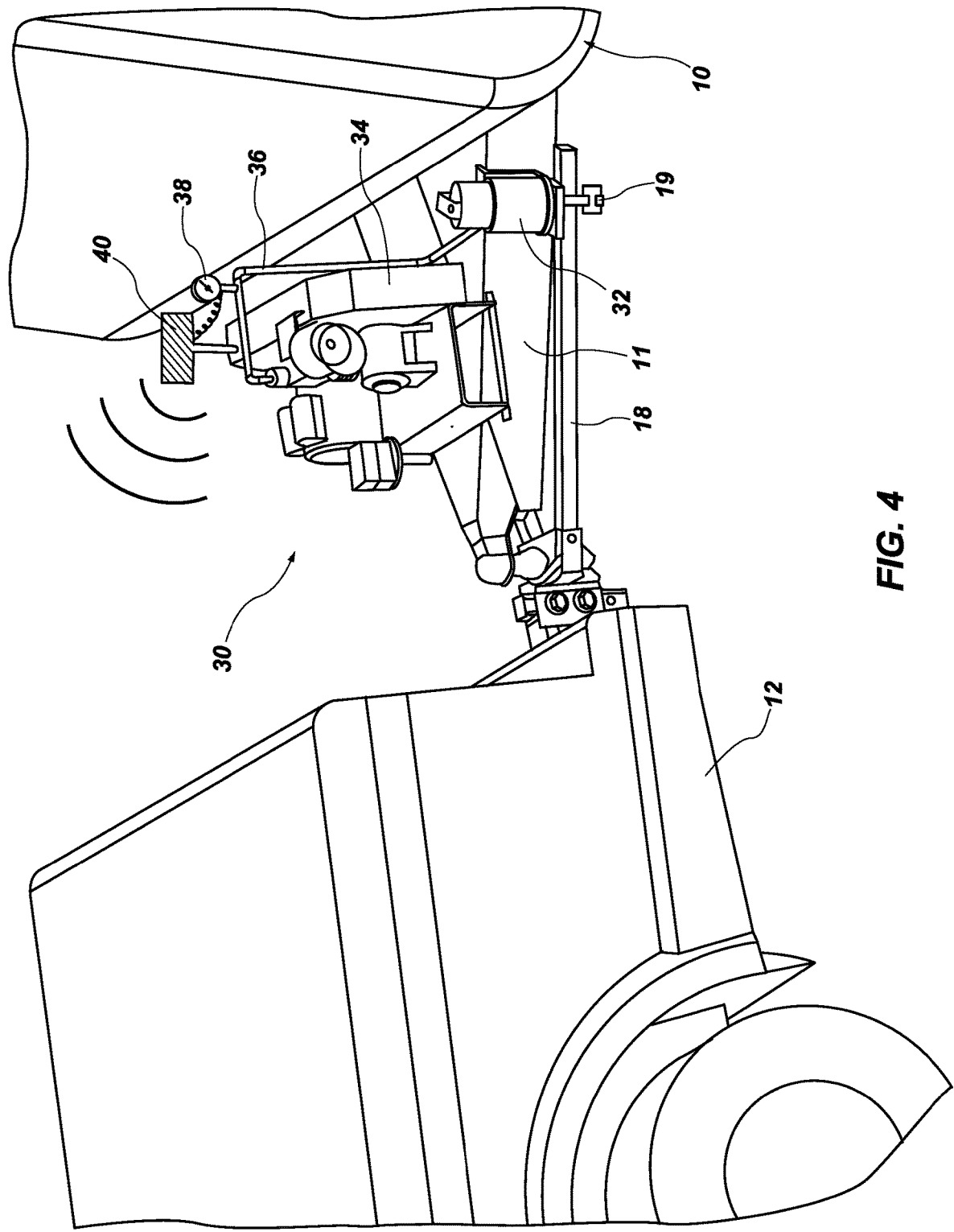
FIG. 4 is a perspective view of the disclosed weight distribution system.
Figure 5:
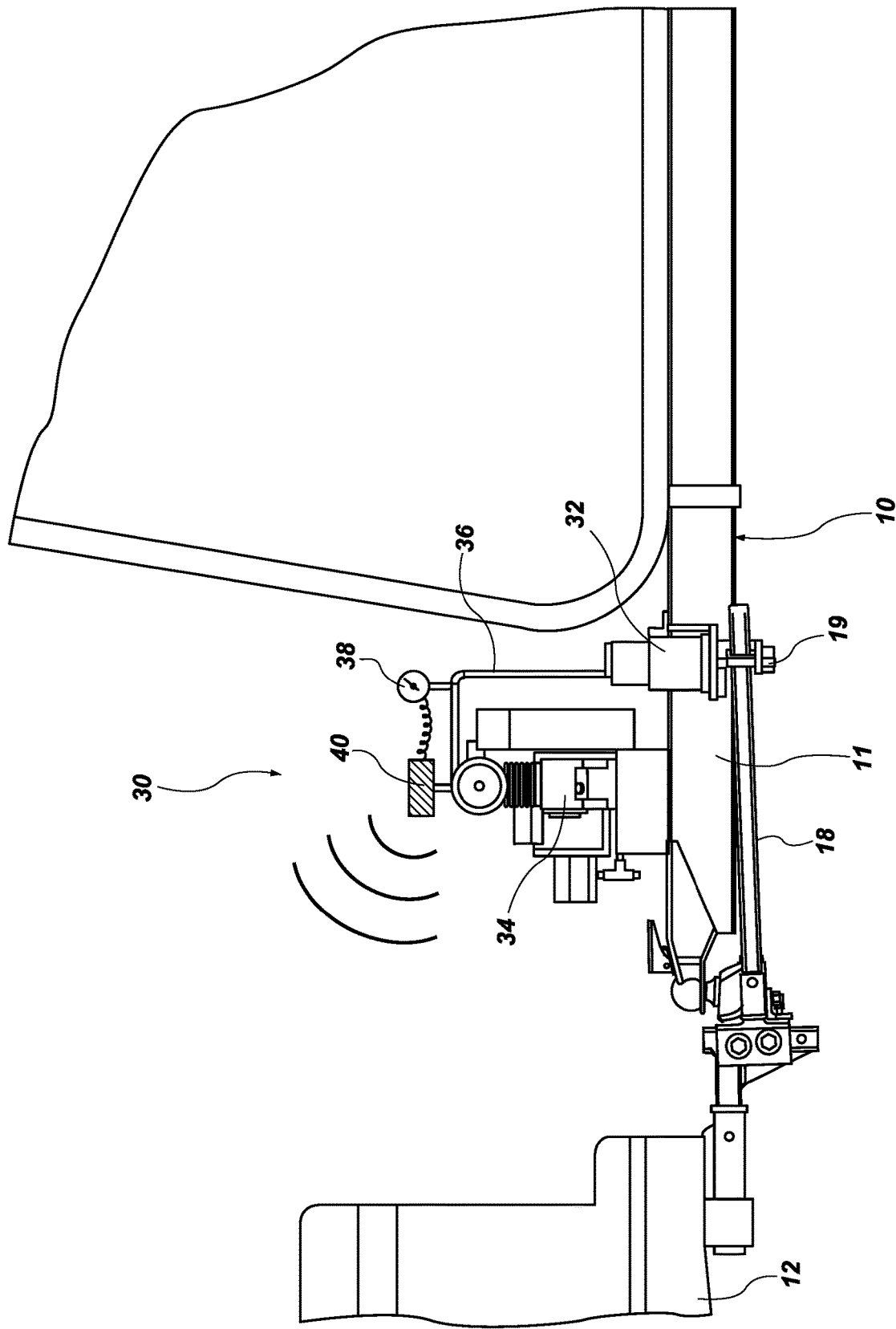
FIG. 5 is a side view of a schematic of the disclosed weight distribution system.

FIGS. 4 and 5, illustrate the trailer 10 and tow vehicle 12 after the trailer 10 is loaded onto the tow vehicle 12, and after engagement of the spring bars or weight distribution mechanism 18. Also shown in FIG. 5 is when the weight distribution mechanism 18 is engaged, the weight of the trailer 10 previous carried by the rear axle 22 is more evenly distributed over the axles of the chassis of the vehicle 12, resulting in the front of the chassis of the vehicle 12 to be closer to level with respect to the front wheels 20 and rear wheels 22.

As shown in FIG. 1, the disclosed weight distribution measurement system may include a temporary or portable measuring device 50 or primary weight distribution sensor. The measuring device 50 may be electronic and configured to measure a linear distance between two objects or surfaces. The measuring device 50 may measure the linear distance by utilizing a laser, which may be visible, or infrared, ultrasonic waves, or other measurement device such as a tape measure, or any other known measuring implement. The measuring device 50 may also include an electronic memory capable of storing multiple measured distances. Additionally, the measuring device 50 may be configured to take a single or multiple measurements at a first location, or multiple locations, and load status and then average the measurements together to provide a more accurate final measurement for any given location and load status.

The measuring device 50 may also include an operating system capable of being programed to perform calculations utilizing the stored measured distances. The measuring device 50 may also include a visual display, that may display measured distances or resultant calculations. Additionally, the measuring device may be configured to transmit or share data to the logic unit 40, such as measured distances, weight distribution status, and/or output calculations, via WiFi, RF, Bluetooth, hardwire or other known electronic transmission mechanism or device.

A disclosed method of measuring weight distribution may include using the portable measuring device 50 to measure and store a first measurement of the tow vehicle, which may be a baseline measurement of the front axle load of the unloaded tow vehicle 12, such as two points or surfaces that may represent the height of a front end of the tow vehicle 12.

After the tow vehicle 12 has been loaded with a trailer 10, but before the weight distribution mechanism 18 is engaged, a second measurement may be taken and stored by the portable measuring device 50. The second measurement is taken at substantially the same location and between the same two points or surfaces as the first measurement.

After the weight distribution mechanism 18 is engaged, a third measurement may be taken and stored by the portable measuring device 50. The third measurement is taken at substantially the same location and between the same two points or surfaces as the first and second measurements.

The portable measuring device 50 may then calculate a percentage of the weight being distributed over the axles of the tow vehicle 12, also known as percent weight distribution.

It is to be understood that the portable measuring device 50 may operate to measure, calculate, or otherwise determine weight distribution as described above, also known as percent weight distribution, regardless of whether portable measuring device 50 utilizes an actual weight measurement of the vehicle 12 or otherwise determines weight distribution without utilizing a weight measurement of vehicle 12 and instead measuring, calculating or determining the weight distribution in some other way, such as, for example, comparing vertical measurement distances and proportionalizing or otherwise relating those measurements to the weight of the vehicle 12 as it is loaded and unloaded. As another example, the vehicle's ride height can be directly related to trailer tongue weight or weight distribution, or weight distribution measurement, such that measuring or determining the weight distribution, or utilizing some proportional representation of the weight distribution, can be accomplished by measuring differences in the vehicle's ride height as the trailer 10 is loaded or unloaded and utilizing differences in the vehicles ride height to represent changes in distribution of the rear axle 22 weight to additional axles of the tow vehicle 12. Weight distribution may also be measured by measuring a downward force exerted on trailer hitch, such as a hitch ball, or by measuring the tow vehicle 12 pitch angle, or any other desired method of measuring weight distribution.

After the portable measuring device 50 performs the percent weight distribution, the portable measuring device 50 may then display or communicate to the logic unit 40, the percent weight distribution or otherwise provide a communication that indicates the weight distribution correct or at a desired predetermined level. The communication can be via Bluetooth, RF, WiFi, or wired connection. Alternatively, the portable measuring device 50 may also, or instead, calculate and display a factor or amount of weight being distributed. The primary sensor or portable measuring device 50 may alternatively utilize optical, radial, linear, load cell, LVDT, string-pot, rod-pot, laser sonic, tilt, accelerometers, or any other desired mechanism to measure the load on the front axle of the tow vehicle 12.

It is to be understood that the portable measuring device 50 may, if desired, be disposed on, in, or in association with, the tow vehicle 12, as shown in FIG. 1, but that said portable measuring device 50 may not necessarily be connected directly, or at all, to the tow vehicle 12. For example, the portable measuring device 50 could be part of a sensing module disposed on trailer 10 or trailer frame 11, or anywhere that would enable said portable measuring device 50 to operate as intended. As noted above, the portable measuring device 50 may also be referred to herein as weight distribution sensor 50. It is to be further understood that the phrase "a weight distribution sensor (50) disposed in association with the tow vehicle (12)" as used herein, shall be construed broadly to cover the concept of any connection between the portable measuring device 50 and the tow vehicle 12 regardless of whether the portable measuring device 50 is attached to the tow vehicle 12 or instead associated with the tow vehicle 12 by measuring or determining weight distribution of the trailer tongue weight onto the tow vehicle 12 or its axles without being attached to the tow vehicle 12, but being in communication with or in association with the tow vehicle 12.

Figure 6:
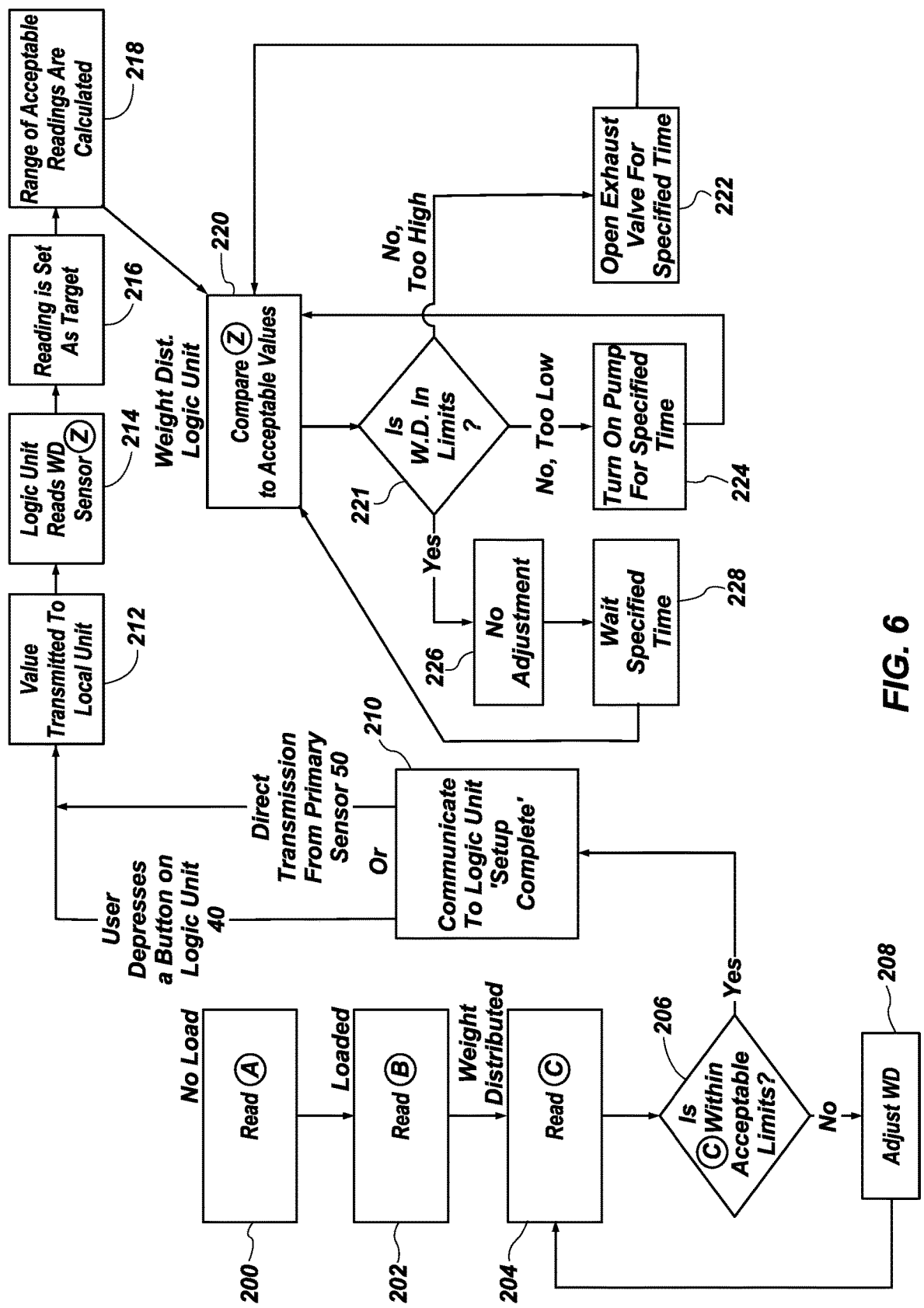
FIG. 6 is circuit diagram of a method of using the disclosed weight distribution system.

The circuit diagram shown in FIG. 6 illustrates a method of adjusting and continuously adjusting weight distribution of the trailer 10 and the tow vehicle 12 by adjusting the vertical position of the spring bars 18 on the spring bar mounts 19 by actuating the weight distribution actuator 30.

In step 200, the primary sensor 50 may be used to measure an unloaded position of the vehicle 12, a first measurement referred to in FIG. 6 as Reading A. In step 202 the primary sensor 50 may be use to measure the position of the vehicle 12 in a fully loaded condition engaged with the trailer 10, but before engagement of the spring bars 18, a second measurement referred to in FIG. 6 as Reading B. In step 204 the primary sensor can measure the position of the vehicle after the spring bars 18 have been engaged with the spring bar mounts 19, to facilitate weight distribution.

A user can then determine if the weight distribution measurement 204 is within an acceptable range 206, if not, the user may adjust 208 the spring bar mounts 19 to facilitate the desire weight distribution, by making manual adjustments or utilizing actuator 34 to make such adjustments. Once the desired weight distribution has been obtained the logic unit 40 may be activated 210 by indicating that the set up is complete. The activation of the logic unit 40 can occur by a manual switch or button, or via direct or wireless communication from the primary sensor 50.

The logic unit 40 may then receive 214 a weight distribution measurement, a measurement referred to in FIG. 6 as Reading Z, or pressure measurement, from the secondary sensor 38, and will set 216 this measurement as a target. The logic unit 40 can then determine 218 a range of acceptable measurements, which can be predetermined by the user, or preloaded based on manufacture specification or recommendations.

The logic unit 40 can then continuously compare 220 weight distribution measurements or reading from the secondary sensor 38 and compare them to the target range, to determine 221 if the weight distribution is within the desired or predetermined weight distribution limits or range. If the weight distribution measurement is outside of the acceptable range, then the logic unit 40 can, for example, actuate the weight distribution actuator 30 to release pressure 222 to lower the spring bars 18 and reduce the weight distribution. Alternatively, the logic unit 40 can, for example, actuate the weight distribution actuator 30 to increase pressure 224 to raise the spring bars 18 and increase the weight distribution.

If the secondary sensor 38 provides a measurement that is within the acceptable range, then the logic unit 40 will not actuate 226 the weight distribution actuator 30. The logic unit 40 may then wait 228 a predetermined interval of time or upon manual triggering, before receiving another measurement from the secondary sensor 38.

This disclosed method of adjusting weight distribution can be done continuously or at predetermined intervals, while the tow vehicle is stopped, or while the tow vehicle 12 is moving.

Figure 7:
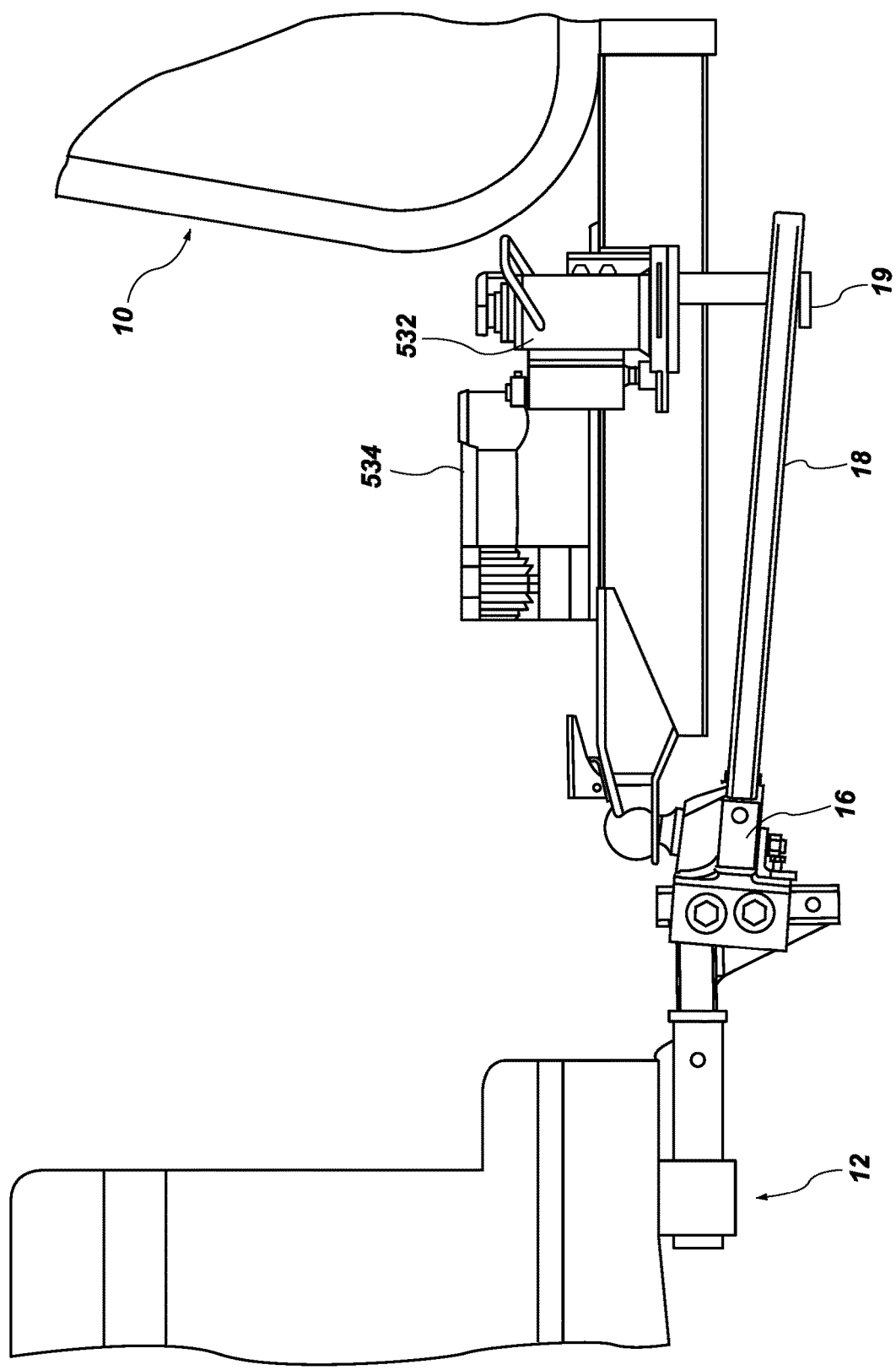
FIG. 7 is a perspective view of another disclosed weight distribution system.

As shown in FIG. 7, a pressure actuator 534 can be an hydraulic pump that may provide power or pressure to a mount actuator 532 to facilitate movement of the corresponding spring bar mount 19.

Figure 8:
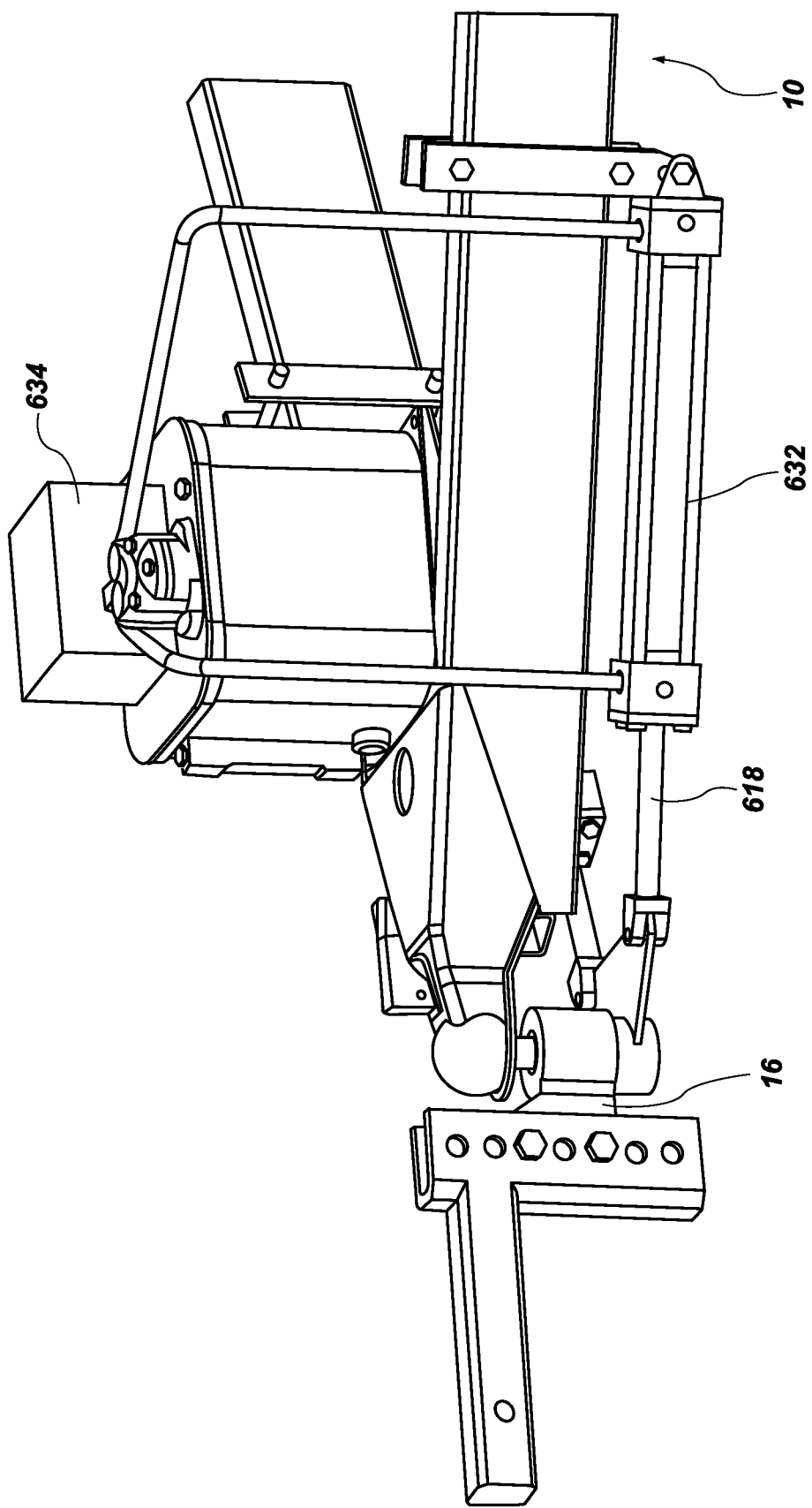
FIG. 8 is a perspective view of another disclosed weight distribution system.

As shown in FIG. 8, a pressure actuator 634 can also be a hydraulic pump that may provide power or pressure to a horizontal mount actuator 632 to facilitate generally horizontal movement of a linear actuator 618, which can increase or decrease bias or torque on the hitch 16, providing and actuating weight distribution to the tow vehicle, not shown.

Figure 9:
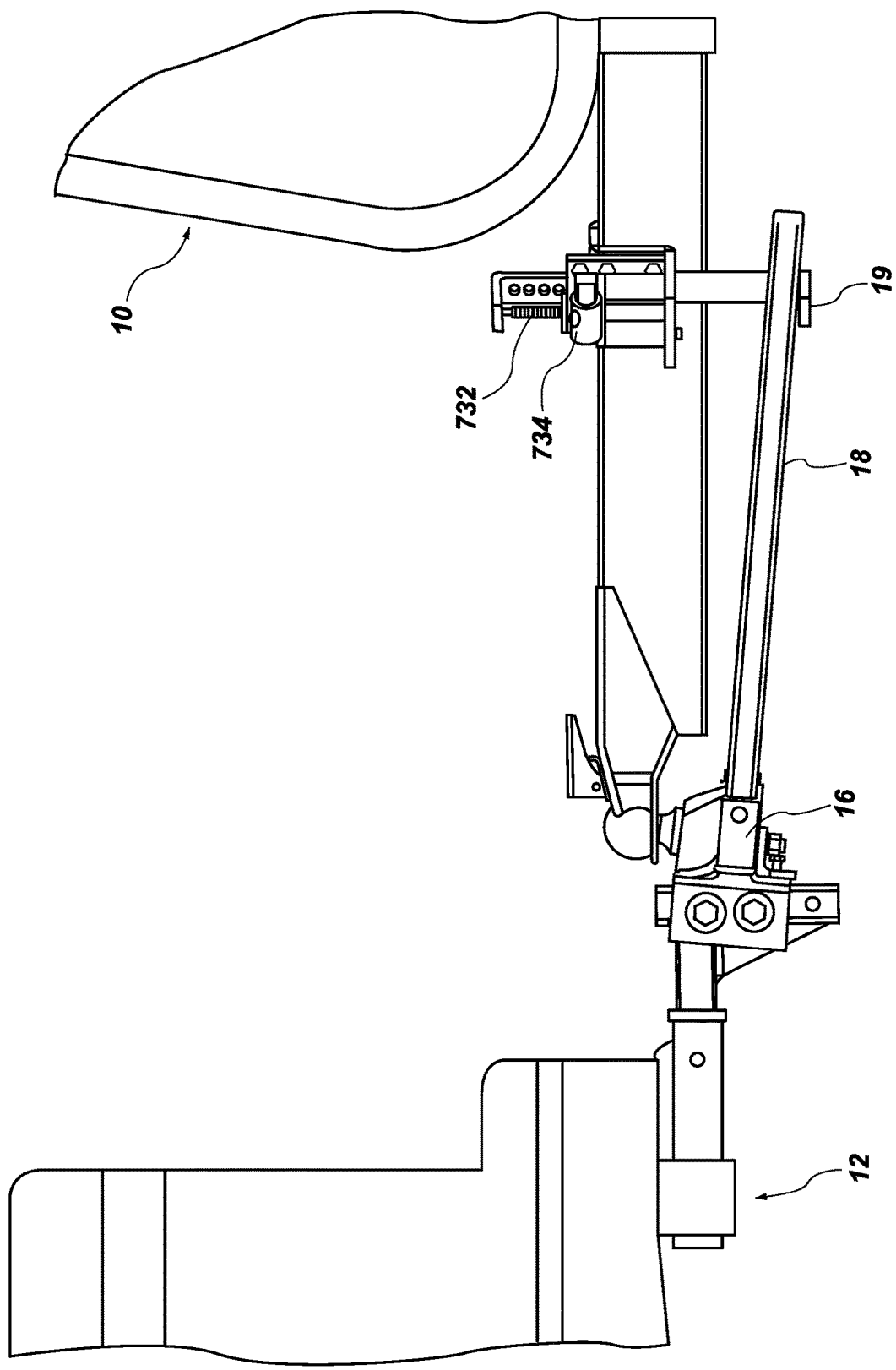
FIG. 9 is a perspective view of another disclosed weight distribution system.

As shown in FIG. 9, an actuator 734 can be an electric motor, such as a rotary motor, for example, that may provide power to actuate a mount actuator 732, such as a screw lift, to facilitate movement of the corresponding spring bar mount 19.

Figure 10:
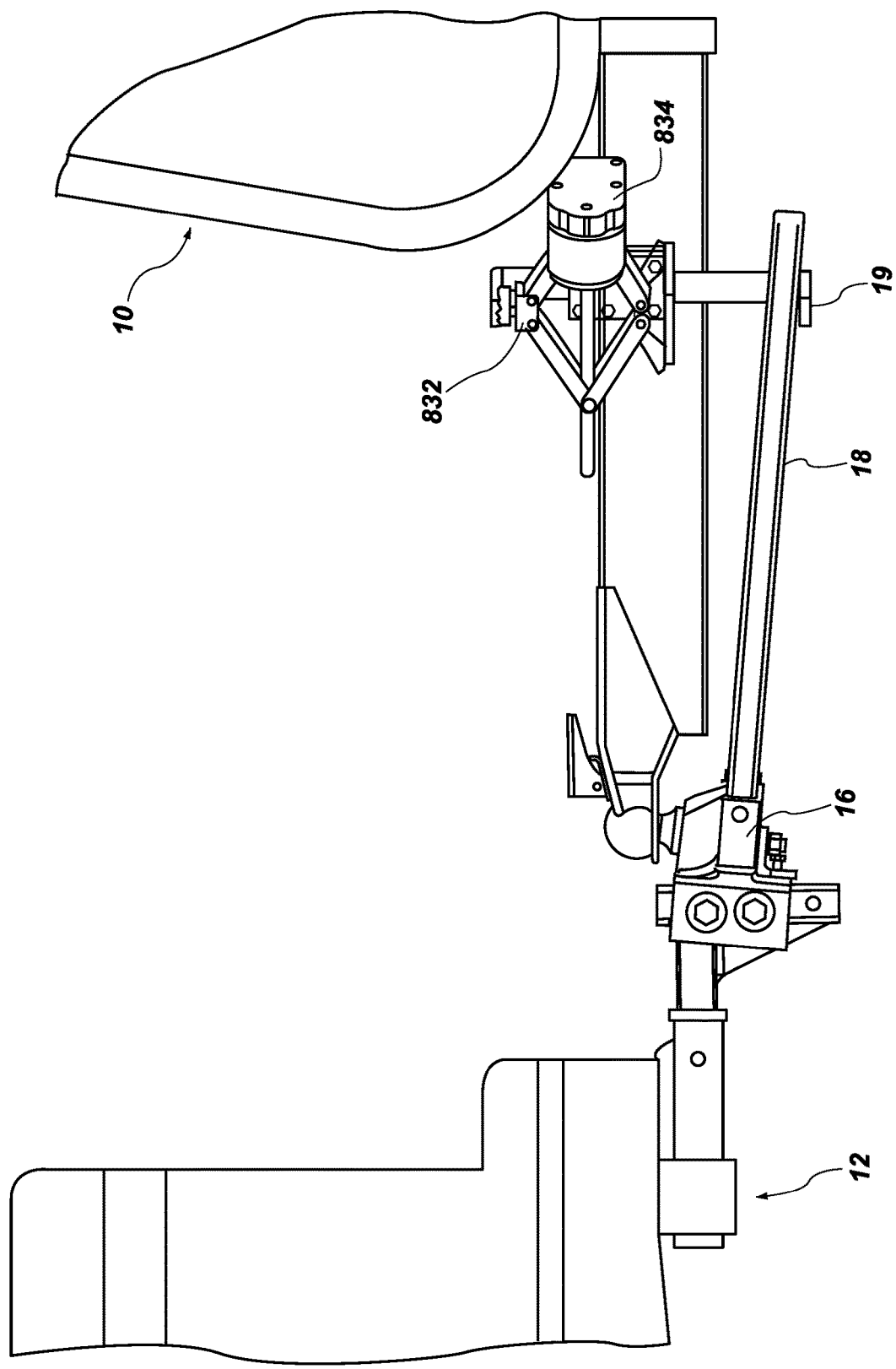
FIG. 10 is a perspective view of another disclosed weight distribution system.

As shown in FIG. 10, an actuator 834 can be an electric motor, such as a rotary motor, for example, that may provide power to actuate a mount actuator 732, such as a scissor lift, to facilitate movement of the corresponding spring bar mount 19.

Each of the actuators 534, 634, 734 and 834 disclosed above may as be configured to incorporate a logic unit 40 as described herein with respect to FIGS. 1-6, to actuate the respective actuators 534, 634, 734 and 834 according to the method described below.

In another embodiment, as illustrated in FIGS. 11-16, a spring bar actuator 130 may include a mount actuator 132 in fluid, mechanical, or electrical communication with a pressure actuator 134 that may be configured to facilitate movement of the mount actuator 132, in a vertical or substantially vertical direction, or generally up and down. The spring bar actuator 130 may be permanently or temporarily mounted to the trailer 10 and may be powered by any desired mechanism, such as a battery, fuel, or desired electrical power or other known power source.

The mount actuator 132 may be an air bag mechanism that inflates to actuate vertical movement of the spring bar mounts 19, with upward vertical movement being facilitated by increased pressure of the air bag and downward vertical movement of the spring bar mounts 19 facilitated by reduced pressure of the air bag. The mount actuator 132 may alternatively be any desired mechanism that can provide generally upward or downward movement of the spring bar mounts 19, such as, for example, pneumatic, hydraulic, or electric powered piston or other vertical, horizontal or angular actuation device or mechanism.

Accordingly, the pressure actuator 134 may be configured to provide pressure or other desired biasing force to the mount actuator 132 to facilitate actuation or movement. The pressure actuator 134 can therefore be an air compressor, hydraulic pump, electric motor, or other desired power mechanism that may provide power to the mount actuator 132 to facilitate movement.

The pressure actuator 134 may be in fluid, mechanical or electrical communication with the mount actuator 132 via a pressure line 136. The pressure line 136, may for example, provide fluid pressure, such as air or hydraulic fluid for example, to the mount actuator 132 to facilitate the desired movement. The pressure line 136 may include a secondary sensor or pressure sensor 138 or other desired measurement device. The pressure sensor 138 may monitor air pressure, hydraulic pressure, linear displacement, or other desired attribute that may facilitate movement of the mount actuator 132.

The pressure sensor 138 may be in communication with a logic unit 140 which may be configured to control the output of the spring bar actuator 130 and more specifically the pressure actuator 134. The logic unit 140 may be programmed to turn on and off the pressure actuator to increase or decease the pressure transferred to the mount actuator 132, thereby moving the mount actuator vertically, up or down, to desired levels or to actuate another mechanism that may increase or decrease weight distribution.

The logic unit 140 may be in communication with the secondary sensor or pressure sensor 138 which can continuously monitor and provide pressure levels of the mount actuator, which can indirectly provide an absolute or relative measurement of weight distribution being provided by the spring bars 18 on the spring bar mounts 19. This communication can be hardwired, or transmitted by electrical signal such as WiFi or bluetooth, for example. The pressure information provided by the pressure sensor 138 may be used by the logic unit to determine if the pressure actuator should be activated to increase or decrease the pressure provided to the mount actuator 132 to move the mount actuator vertically up or down, to compensate for changes in trailer load or to meet a desired target weight distribution.

Figure 12:
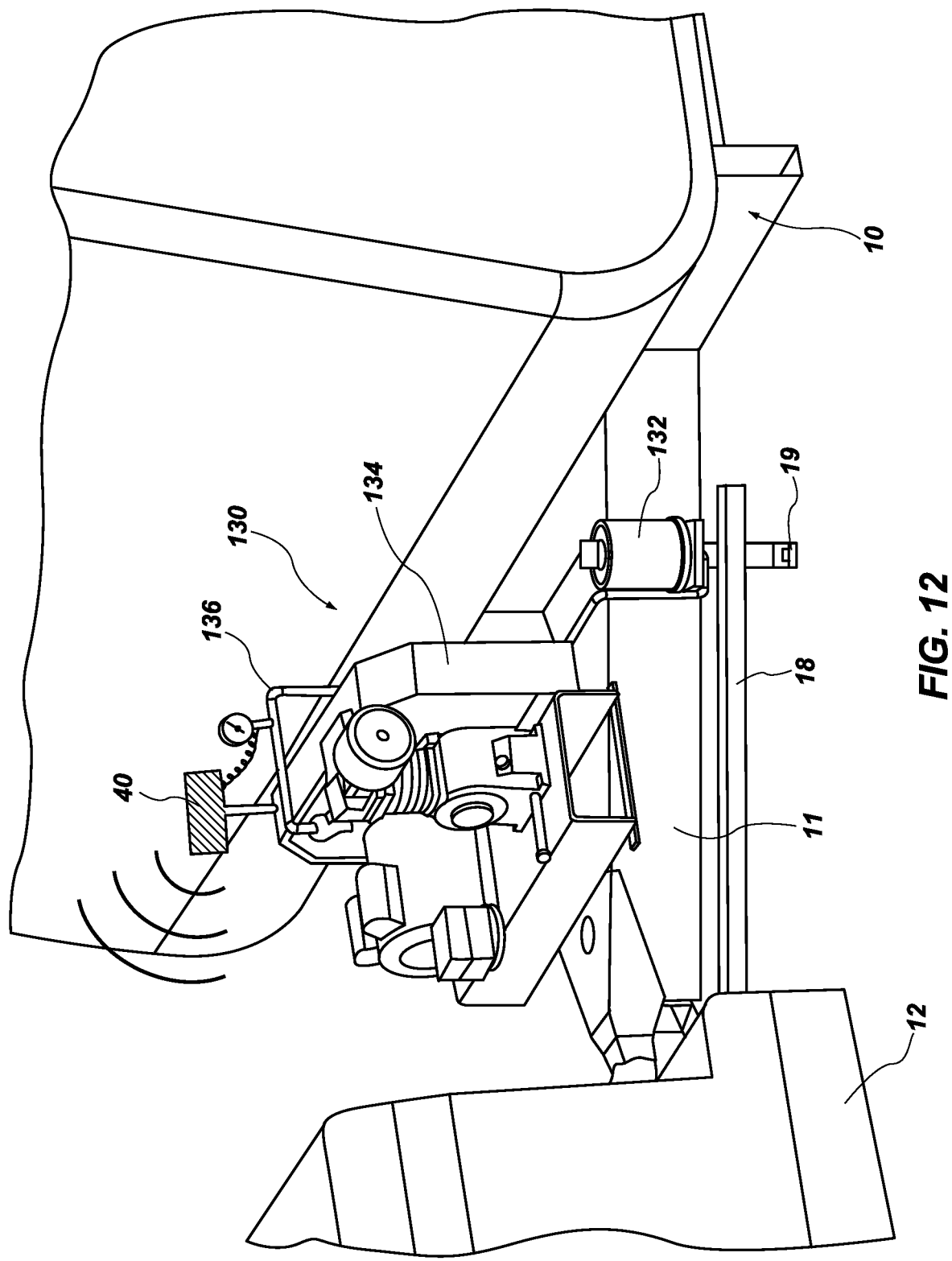
FIG. 12 is a perspective view of the disclosed weight distribution system.
Figure 13:
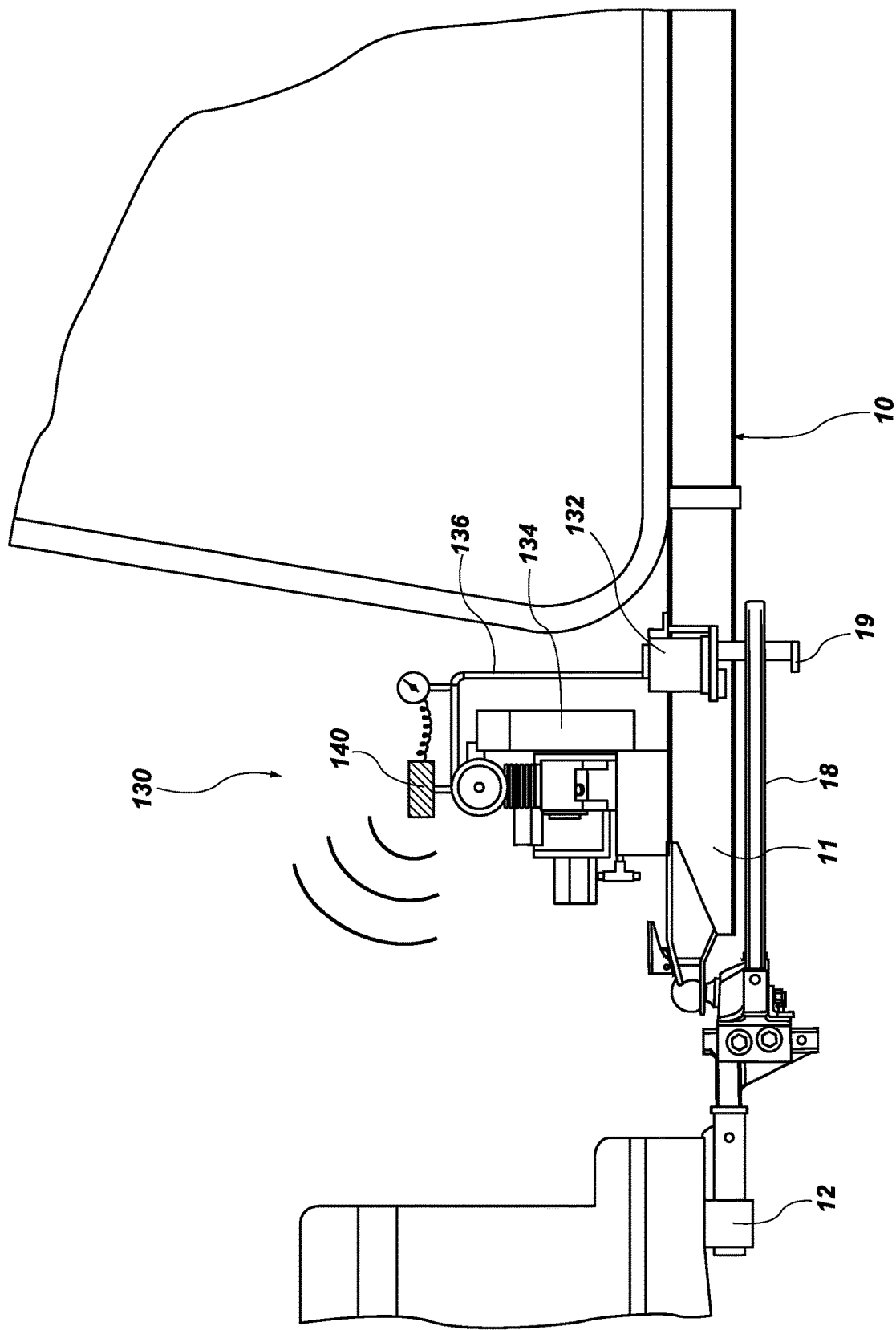
FIG. 13 is a side view of a schematic of the disclosed weight distribution system.

FIGS. 12 and 13, illustrate the trailer 10 and tow vehicle 12 after the trailer 10 is loaded onto the tow vehicle 12, but before engagement of the spring bars or weight distribution mechanism 18. Also shown in FIGS. 12 and 13 is the tow vehicle 12 in a loaded state, meaning the trailer hitch 16 and rear wheels 22 may be holding the substantial majority of the tongue weight of the trailer 10, causing the chassis of the vehicle 12 to substantially tilt toward the rear of the vehicle 12, causing the front of the vehicle 12 to raise up from the front wheels 20, or front axle.

Figure 14:
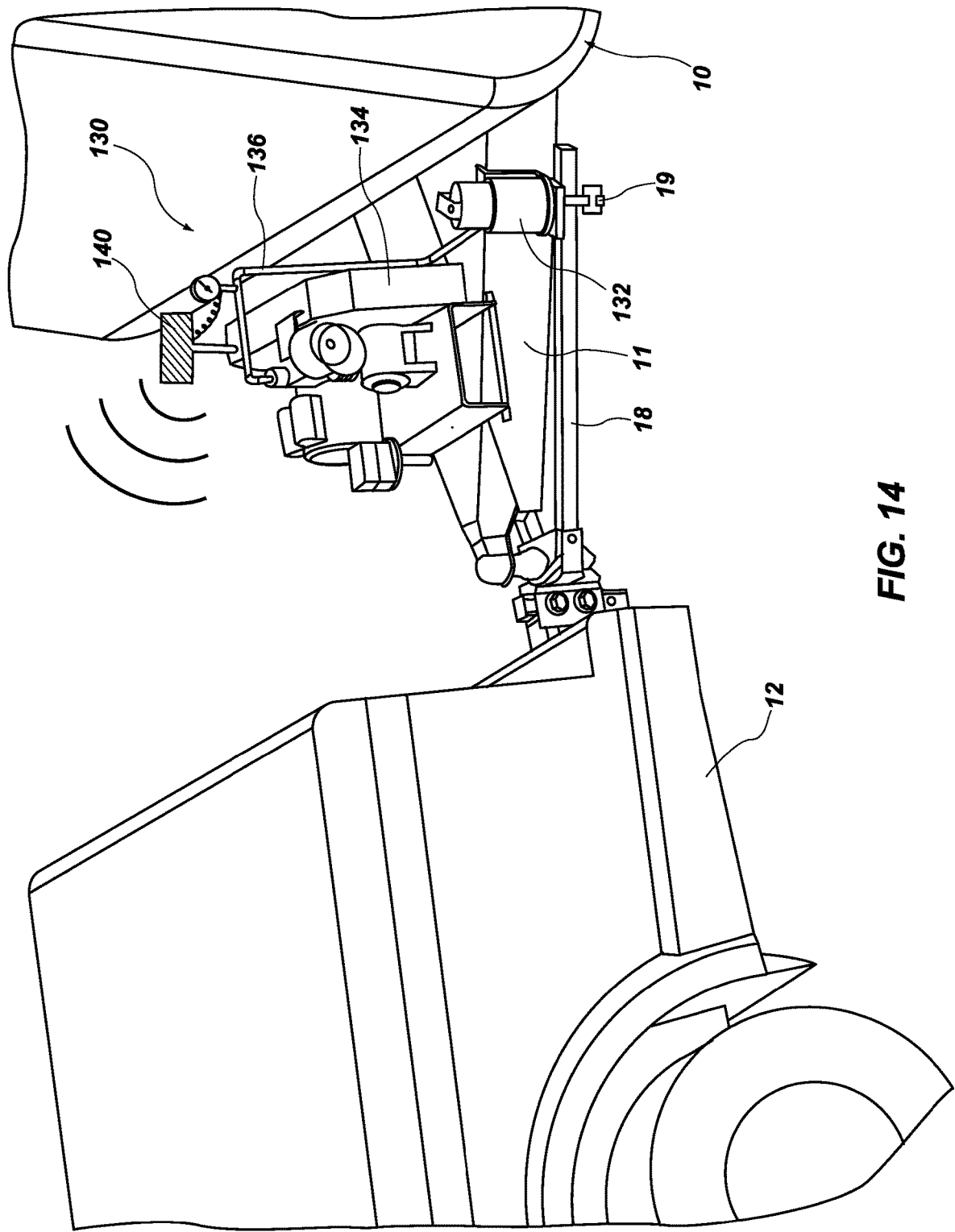
FIG. 14 is a perspective view of the disclosed weight distribution system.
Figure 15:
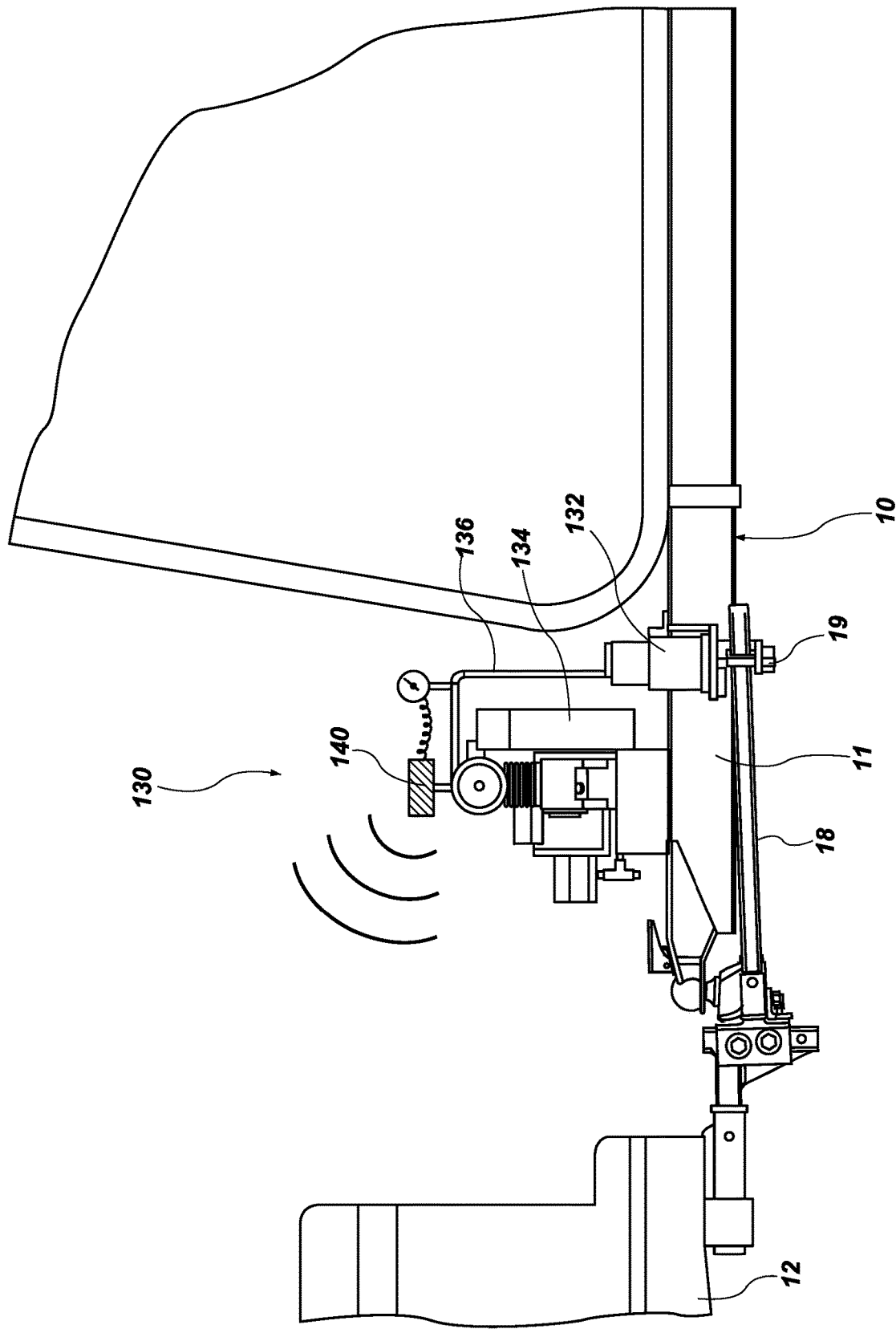
FIG. 15 is a side view of a schematic of the disclosed weight distribution system.

FIGS. 14 and 15, illustrate the trailer 10 and tow vehicle 12 after the trailer 10 is loaded onto the tow vehicle 12, and after engagement of the spring bars or weight distribution mechanism 18. Also shown in FIG. 14 is when the weight distribution mechanism 18 is engaged, the weight of the trailer 10 is more evenly distributed over the axles of the chassis of the vehicle 12, resulting in the front of the chassis of the vehicle 12 to be closer to unloaded level with respect to the front wheels 20 and rear wheels 22.

Figure 11:
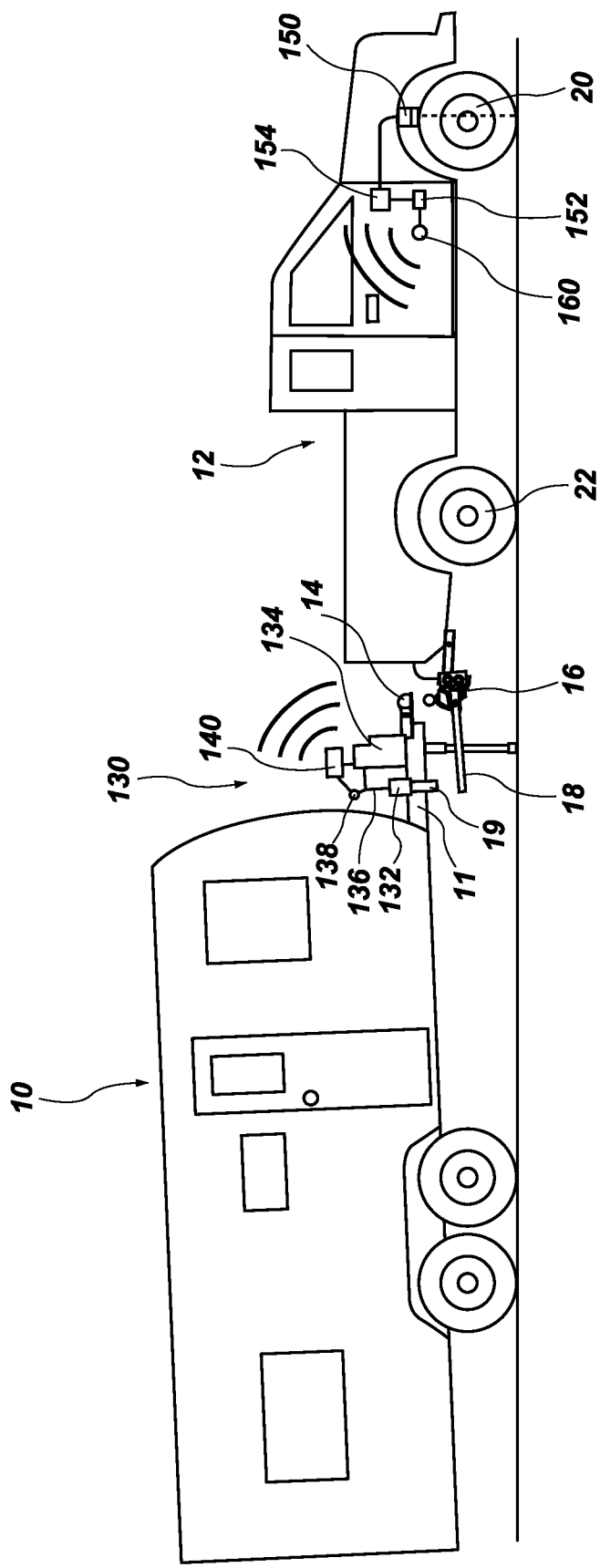
FIG. 11 is a side view of a schematic of the disclosed weight distribution system.

As shown in FIG. 11, the disclosed weight distribution measurement system may include a weight distribution interface or primary sensor 150 or primary weight distribution sensor. The primary sensor 150 can directly communicate with a vehicle onboard computer 154, via hard-wired communication or wireless communication, and receive weight distribution related measurements, such as ride height or other related measurements. The onboard computer 154 may be an OEM feature of the tow vehicle 12 or an add-on feature. The onboard computer 154 may be equipped with a ride height measurement system, not shown, that continuously monitors the vehicle's ride height, which can be directly related to weight distribution, or other weight distribution measurements. It is to be understood that the phrase "ride height" may be broadly defined as the amount of space between the base of a vehicle tire, such as a ground surface, and the lowest point of a vehicle body, such as a front or rear axle. This onboard weight distribution measurement system may be an OEM feature or an add-on features, but is well known in the art and therefore, additional specific details are not disclosed herein, as part of the disclose weight distribution system.

The primary sensor 150 may alternatively utilize optical, radial, linear, load cell, LVDT, string-pot, rod-pot, laser sonic, tilt, accelerometers, or any other desired mechanism to measure the load on the front axle of the tow vehicle 12. A communication device 160 may be in direct or indirect communication, wired or wirelessly, with primary sensor 150, and may be configured to transmit or share data, received from the primary sensor 150, to the logic unit 140, such as ride height and/or other weight distribution measurements, via WiFi, RF, bluetooth, hardwire or other known electronic transmission mechanism or device.

It is to be understood that the primary sensor 150 may, if desired, be disposed on, in, or in association with, the tow vehicle 12, as shown in FIG. 11, but that said primary sensor 150 may not necessarily be connected directly, or at all, to the tow vehicle 12. For example, the primary sensor 150 could be part of a sensing module disposed on trailer 10 or trailer frame 11, or anywhere that would enable said primary sensor 150 to operate as intended. As noted above, the primary sensor 150 may also be referred to herein as a weight distribution sensor 150. It is to be further understood that the phrase "a weight distribution sensor (150) disposed in association with the tow vehicle (12)" as used herein, shall be construed broadly to cover the concept of any connection between the primary sensor 150 and the tow vehicle 12 regardless of whether the primary sensor 150 is attached to the tow vehicle 12 or instead associated with the tow vehicle 12 by measuring or determining weight distribution of the trailer tongue weight onto the tow vehicle 12 or its axles without being attached to the tow vehicle 12, but being in communication with or in association with the tow vehicle 12.

Figure 16:
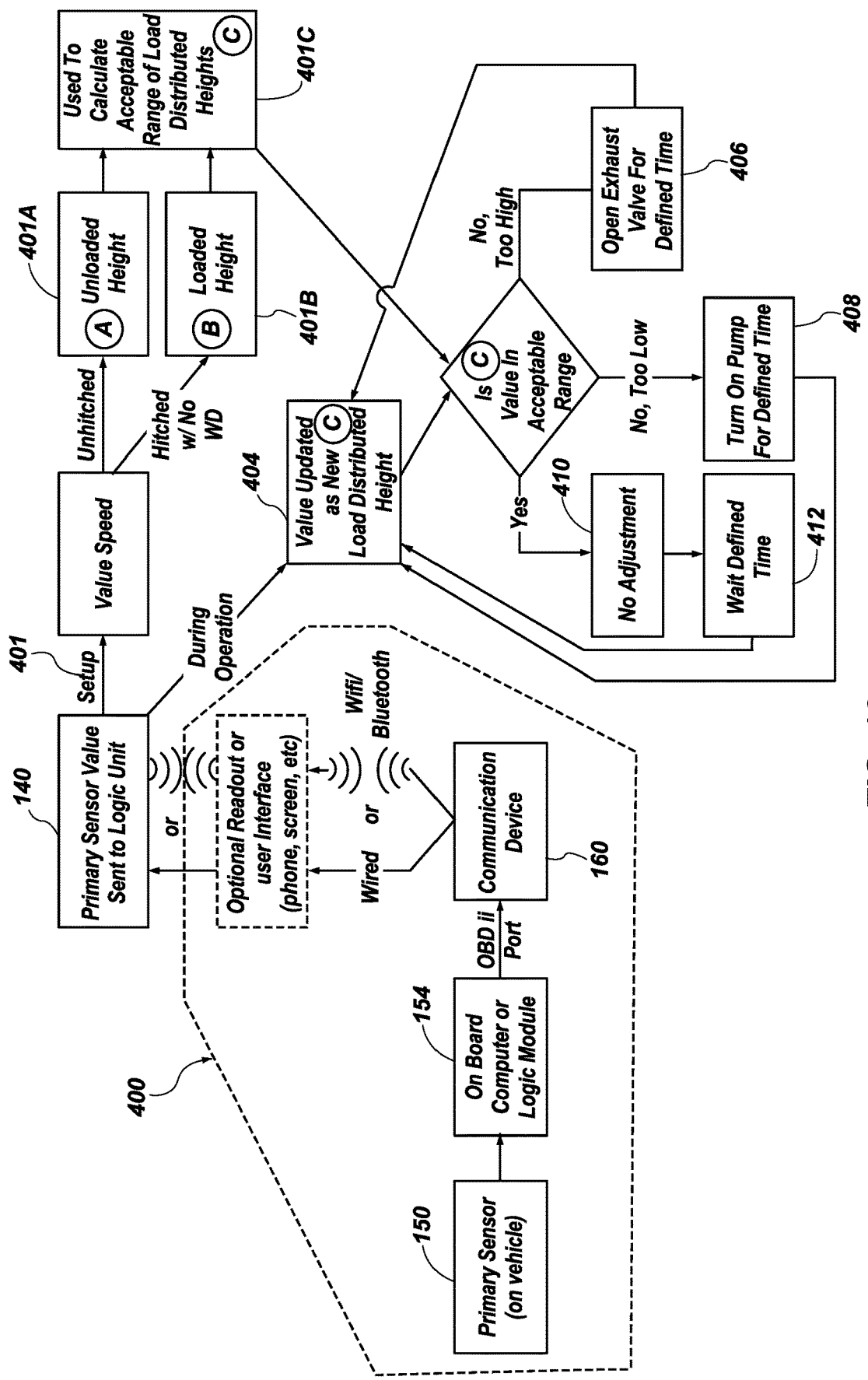
FIG. 16 is circuit diagram of a method of using the disclosed weight distribution system.

The circuit diagram shown in FIG. 16 illustrates a method of adjusting and continuously adjusting weight distribution of the trailer 10 and the tow vehicle 12 by adjusting the vertical position, or load bias in any direction, of the spring bars 18 on the spring bar mounts 19 by actuating the weight distribution actuator 30.

In step 400 the primary sensor 150 may be used to measure weight distribution or ride height measurements and then communicate such measurements to the onboard OEM computer 154, and then transmit such information or measurements to the communication device 160 which can then transmit these measurements to the logic unit 140. The communication device 160 may include an optional readout, visual display, and/or user interface, such as a smart phone, tablet, screen or other desired interface. The communication device 160 can be in direct hardwired communication with the visual display, or with the logic unit 140. Alternatively, the communication device 160 can be in wireless communication with either the visual display or directly with the logic unit 140.

During an initial setup process, in step 401A, the primary sensor 150 may be used to measure an unloaded ride height position of the vehicle 12, a first measurement referred to in FIG. 16 as reading A, unloaded height. In step 401B the primary sensor 150 may be used to measure the ride height position of the vehicle 12 in a fully loaded condition engaged with the trailer 10, but before engagement of the spring bars 18, this second measurement referred to in FIG. 16 as reading B, loaded height. Readings A and B may then be used by a user or logic unit to calculate or determine an acceptable range of load distributed ride heights. In step 401C the primary sensor 150 can measure the ride height position of the vehicle 12 after the spring bars 18 have been engaged with the spring bar mounts 19, which is shown as reading C.

A user or logic unit can then determine if the weight distribution measurement, or ride height reading C, is within an acceptable range, if not, the user or logic unit may adjust the spring bar mounts 19, using the actuator 34, to facilitate the desired weight distribution. Once the desired weight distribution has been obtained the logic unit 140 may be activated by indicating that the set up is complete. The activation of the logic unit 140 can occur by a manual switch or button, or via direct or wireless communication from the primary sensor 150.

The ride height measurements, updated readings C, can then be updated during operation of the vehicle at predetermined time intervals or by manual command by the user. These updated measurements identified by the primary sensor 150 can then be transmitted to the logic unit 140 and the logic unit 140 can then determine if the weight distribution measurement is within a desired or acceptable range 404. This range may be predetermined by the user, or preloaded on the logic unit 140 based on manufacture specification or recommendations.

The logic unit 140 may then receive updated weight distribution measurements from the primary sensor 150 and the logic unit 140 can monitor if the weight distribution measurements, referred to in FIG. 16 as value C, are within the target or desired range. If the ride height reading C, or weight distribution measurement, is outside of the acceptable range, then the logic unit 140 can, for example, actuate the weight distribution actuator 130 to release pressure 406 to lower the spring bars 18 and reduce the weight distribution. Alternatively, the logic unit 140 can, for example, actuate the weight distribution actuator 130 to increase pressure 408 to raise the spring bars 18 and increase weight distribution.

If the primary sensor 150 provides a weight distribution measurement that is within the acceptable range, then the logic unit 140 will not actuate 410 the weight distribution actuator 130. The logic unit 40 may then wait 412 a predetermined interval of time before receiving another measurement from the primary sensor 150.

This disclosed method of adjusting weight distribution can be done continuously or at predetermined intervals, while the tow vehicle is stopped, or while the tow vehicle 12 is moving.

The term "measuring device," as used herein, shall each be construed broadly to cover any device, now known or later discovered, capable of measuring, or determining a linear distance.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for automated trailer weight distribution, comprising:
   a tow vehicle having a hitch mount having a spring bar;
   a trailer;
   a spring bar mount disposed on the trailer and having an initial position relative to the trailer, wherein the spring bar mount is configured to receive and engage the spring bar;
   a weight distribution measurement device disposed in association with the tow vehicle and being configured and arranged to determine a weight distribution of the tow vehicle when the spring bar is engaged with the spring bar mount; and
   a weight distribution actuator configured and arranged to adjust a height of the spring bar mount while engaged with the spring bar, wherein the weight distribution actuator communicates with the weight distribution measurement device such that said weight distribution measurement device operates to activate the weight distribution actuator to adjust the position of the spring bar mount.

2. The system of claim 1, wherein the weight distribution measurement device is portable.

3. The system of claim 1, wherein the weight distribution actuator includes a logic unit configured to receive information from the weight distribution measurement device.

4. The system of claim 3, wherein the logic unit is configured to activate the weight distribution actuator when a received weight distribution measurement is outside of a target range.

5. The system of claim 3, further comprises:
   a secondary sensor, which is configured to continuously monitor the weight distribution on the spring bar.

6. The system of claim 5, wherein the secondary sensor communicates with the logic unit to provide the weight distribution on the spring bar.

7. The system of claim 5, wherein the logic unit wirelessly communicates with the secondary sensor.

8. The system of claim 1, wherein the weight distribution actuator is pneumatic.

9. The system of claim 1, wherein the weight distribution actuator is hydraulic.

10. The system of claim 1, wherein the weight distribution actuator is electric.

11. The system of claim 1, wherein the weight distribution actuator is mechanical.

12. The system of claim 5, wherein the logic unit wirelessly communicates with the weight distribution measurement device.

13. A system for automated trailer weight distribution, comprising:
    a tow vehicle, wherein the tow vehicle has a hitch mount having a spring bar;
    a trailer;
    a spring bar mount disposed on the trailer, wherein the spring bar mount is configured to receive and engage the spring bar;
    a weight distribution actuator configured and arranged to adjust a height of the spring bar mount while engaged with the spring bar;
    wherein the tow vehicle has a primary sensor and an onboard computer that communicates with the primary sensor, wherein the onboard computer is configured and arranged to measure weight distribution of the tow vehicle, and wherein the primary sensor is configured and arranged to communicate with the weight distribution actuator; and
    wherein the onboard computer is configured and arranged to activate the weight distribution actuator, utilizing the weight distribution measurements.

14. The system of claim 13, wherein the primary sensor is configured to continuously monitor weight distribution of the trailer.

15. The system of claim 13, further comprises:
a secondary sensor, which is configured to continuously monitor the weight distribution on the spring bar.

16. The system of claim 13, wherein the weight distribution actuator includes a logic unit configured to receive information from the primary sensor.

17. The system of claim 16, wherein the logic unit is configured to activate the weight distribution actuator if a received weight distribution measurement is outside of a target range.

18. The system of claim 13, wherein the weight distribution actuator is pneumatic.

19. The system of claim 13, wherein the weight distribution actuator is hydraulic.

20. The system of claim 13, wherein the weight distribution actuator is electric.

21. The system of claim 13, wherein the weight distribution actuator is mechanical.

22. The system of claim 15, wherein a logic unit wirelessly communicates with the primary sensor.

23. The system of claim 15, wherein the secondary sensor communicates with a logic unit to provide the weight distribution on the spring bar.

24. The system of claim 22, the logic unit wirelessly communicates with the secondary sensor.

25. The system of claim 13, wherein the primary sensor is configured to monitor weight distribution of the tow vehicle at a predetermined time interval.

26. A system for automated trailer weight distribution, comprising:
a tow vehicle having a hitch mount having a spring bar;
a trailer;
a spring bar mount disposed on the trailer and having an initial position relative to the trailer, wherein the spring bar mount is configured to receive and engage the spring bar;
a weight distribution measurement device disposed in association with the tow vehicle and being configured and arranged to determine a weight distribution of the tow vehicle when the spring bar is engaged with the spring bar mount;
a weight distribution actuator configured and arranged to adjust a height of the spring bar mount while engaged with the spring bar, wherein the weight distribution actuator communicates with the weight distribution measurement device such that said weight distribution measurement device operates to activate the weight distribution actuator to adjust the position of the spring bar mount, and wherein the weight distribution actuator is pneumatic, and wherein the weight distribution measurement device is portable, and wherein the weight distribution actuator includes a logic unit configured to receive information from the weight distribution measurement device, and wherein the logic unit is configured to activate the weight distribution actuator when a received weight distribution measurement is outside of a target range, and wherein the logic unit wirelessly communicates with the weight distribution measurement device; and
a secondary sensor, which is configured to continuously monitor the weight distribution on the spring bar, wherein the secondary sensor communicates with the logic unit to provide the weight distribution on the spring bar, wherein the logic unit wirelessly communicates with the secondary sensor.

* * * * *